(12) United States Patent
James, Jr. et al.

(10) Patent No.: US 7,694,280 B2
(45) Date of Patent: Apr. 6, 2010

(54) SYSTEMS AND METHODS FOR CONTROLLING PROGRAM INSTALLATION ON A COMPUTING DEVICE

(75) Inventors: Don R. James, Jr., Houston, TX (US); Norm Brown, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1104 days.

(21) Appl. No.: 10/812,220

(22) Filed: Mar. 29, 2004

(65) Prior Publication Data

US 2005/0216909 A1 Sep. 29, 2005

(51) Int. Cl.
*G06F 9/44* (2006.01)
(52) U.S. Cl. ........................ 717/127; 717/174; 717/175; 717/176; 717/177; 717/178
(58) Field of Classification Search .......... 717/174–178
See application file for complete search history.

(56) References Cited

U.S. PATENT DOCUMENTS

| | | | | |
|---|---|---|---|---|
| 5,666,293 A | * | 9/1997 | Metz et al. .................. 709/220 |
| 6,122,732 A | * | 9/2000 | Ahuja .......................... 713/1 |
| 6,513,159 B1 | * | 1/2003 | Dodson ....................... 717/178 |
| 7,051,211 B1 | * | 5/2006 | Matyas et al. ................ 717/174 |
| 7,415,707 B2 | * | 8/2008 | Taguchi et al. .............. 717/174 |
| 2003/0079126 A1 | * | 4/2003 | Kadam et al. ................ 713/168 |
| 2003/0218628 A1 | * | 11/2003 | Deshpande et al. .......... 345/738 |
| 2004/0181790 A1 | * | 9/2004 | Herrick ....................... 717/168 |
| 2004/0243997 A1 | * | 12/2004 | Mullen et al. ................ 717/174 |
| 2005/0066324 A1 | * | 3/2005 | Delgado et al. .............. 717/170 |
| 2005/0166196 A1 | * | 7/2005 | Grier et al. ................... 717/162 |
| 2009/0019547 A1 | * | 1/2009 | Palliyil et al. ................. 726/25 |

* cited by examiner

*Primary Examiner*—Wei Y Zhen
*Assistant Examiner*—Junchun Wu

(57) ABSTRACT

In one embodiment, a system and method for controlling program download pertain to determining the configuration of an existing program that executes on the computing device, determining the configuration of a new program that is to be installed on the computing device to replace the existing program, determining whether installation of the new program is authorized, and preventing installation of the new program if installation is not authorized.

18 Claims, 5 Drawing Sheets

SYSTEMS AND METHODS FOR CONTROLLING PROGRAM INSTALLATION ON A COMPUTING DEVICE

BACKGROUND

Most computing devices comprise some form of operating system that controls the execution of other programs and manages scheduling, input-output, files and data, and memory usage. From time to time, users may wish to replace those operating systems. For example, replacement may be appropriate when the operating system becomes corrupted or when the system developer creates a software patch that is intended to remedy one or more glitches of the system. In other cases, the developer may create a new version of the operating system that users may wish to install.

In some cases, a device owner may be entitled to install a new operating system image to replace an existing operating system for little or no charge. One example of such a case relates to terminal computers that comprise an embedded version of an operating system stored in re-writable, solid-state memory of the computer. When a user purchases such a device, the user becomes licensed to use the embedded operating system stored in the device and may be entitled to download that same operating system from the Internet for recovery purposes or even download a new version of the operating system for free or for a nominal charge.

One problem with the scenario described above is that device users that purchased a computing device (e.g., terminal computer) that comprises a given type of operating system may attempt to download and install a different type of operating system for which the user is not licensed. For example, if the user purchased a computer that comprises Microsoft Windows CE™, that user may not be entitled to install Microsoft Windows XP™. Therefore, needed is a system and method to control what programs, including operating systems, can be installed on a computing device.

SUMMARY

In one embodiment, a system and method for controlling program download pertain to determining the configuration of an existing program that executes on the computing device, determining the configuration of a new program that is to be installed on the computing device to replace the existing program, determining whether installation of the new program is authorized, and preventing installation of the new program if installation is not authorized.

BRIEF DESCRIPTION OF THE DRAWINGS

The systems and methods of this disclosure can be better understood with reference to the following drawings. The components in the drawings are not necessarily to scale.

DETAILED DESCRIPTION

Disclosed are systems and methods through which program installation on a computing device can be controlled. In some embodiments, an installer program that executes on the computing device determines what operating system the computing device is currently running, what operating system the user is attempting to install on the computing device, and whether the operating system the user is attempting to install may be properly installed.

Figure 1:
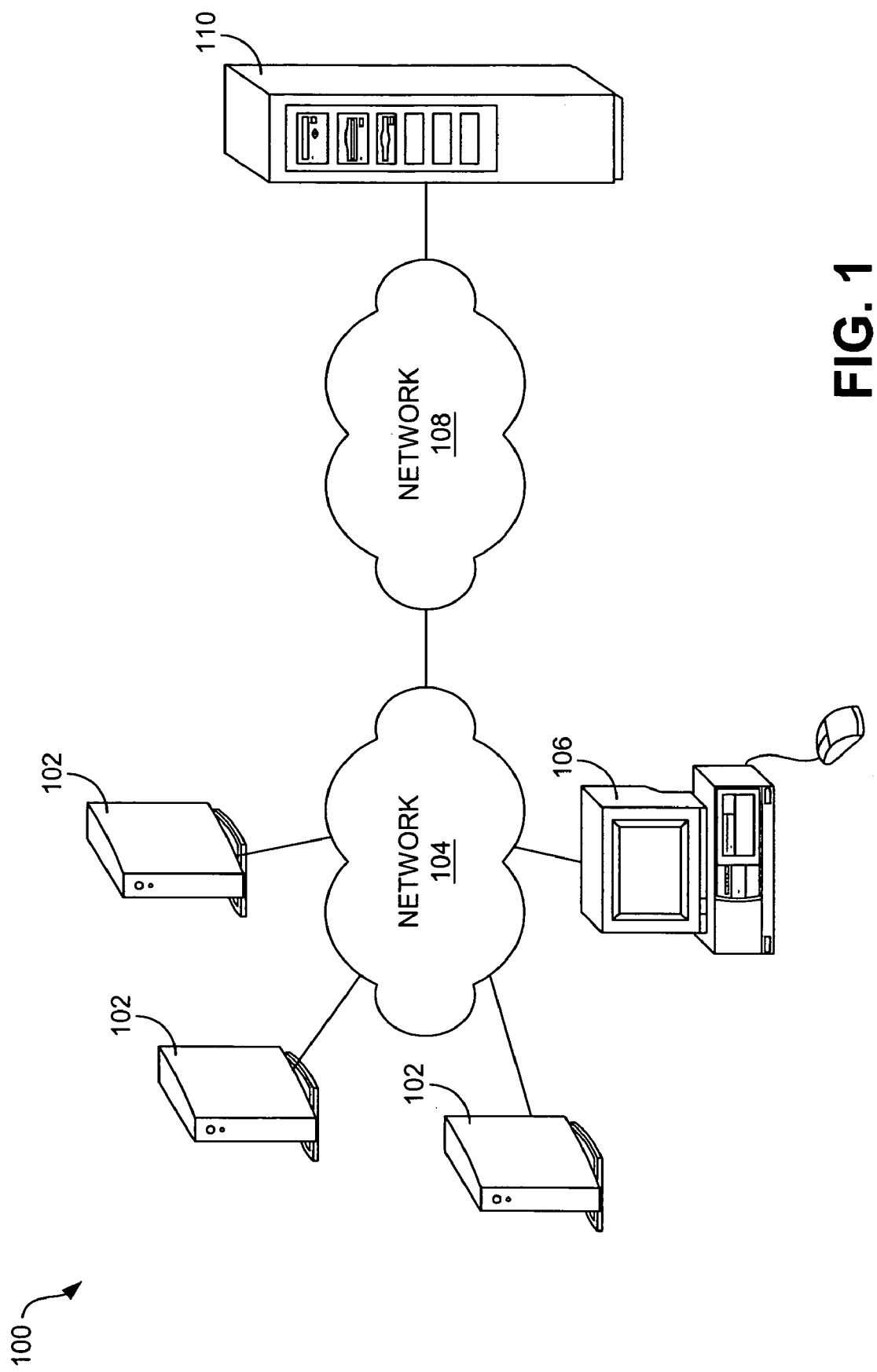
FIG. 1 is a schematic view of an embodiment of a system in which installation of programs on a computing device can be controlled.

Referring now in more detail to the figures in which like numerals identify corresponding parts, FIG. 1 illustrates an example system 100. As indicated in this figure, the system 100 generally comprises one or more computing devices 102 that are connected to a first network 104. By way of example, the computing devices 102 comprise terminal computers that comprise embedded operating systems in re-writable, solid-state memory. Although terminal computers have been specifically identified, the computing devices 102 could, alternatively, comprise other types of computers such as personal computers (PCs), workstations, notebook computers, or any other type of computer that comprises a program (e.g., operating system) that may need to be patched, updated, upgraded, or re-installed. The first network 104 comprises a local network, for instance a local area network (LAN) provided at a given location of a business or other concern. In some embodiments, many computing devices 102 (e.g., hundreds) may be connected to the first network 104.

Also connected to the first network 104 is a central control computer 106. The central control computer 106, when provided in the system 100, is used to, among other things, initiate and coordinate download of programs to the computing devices 102. By way of example, the central control computer 106 comprises a PC that is operated by an administrator of the first network 104 (e.g., information technology manager).

As is further illustrated in FIG. 1, the system 100 can further comprise a second network 108 that, for example, is an external, wide-area network (WAN) that comprises part of the Internet. Connected to the second network 108 is at least one server computer 110 (only one server computer shown), which comprises programs available for downloading via the network 108. By way of example, those programs comprise one or more operating system images that may be installed to replace an existing embedded operating system.

Figure 2:
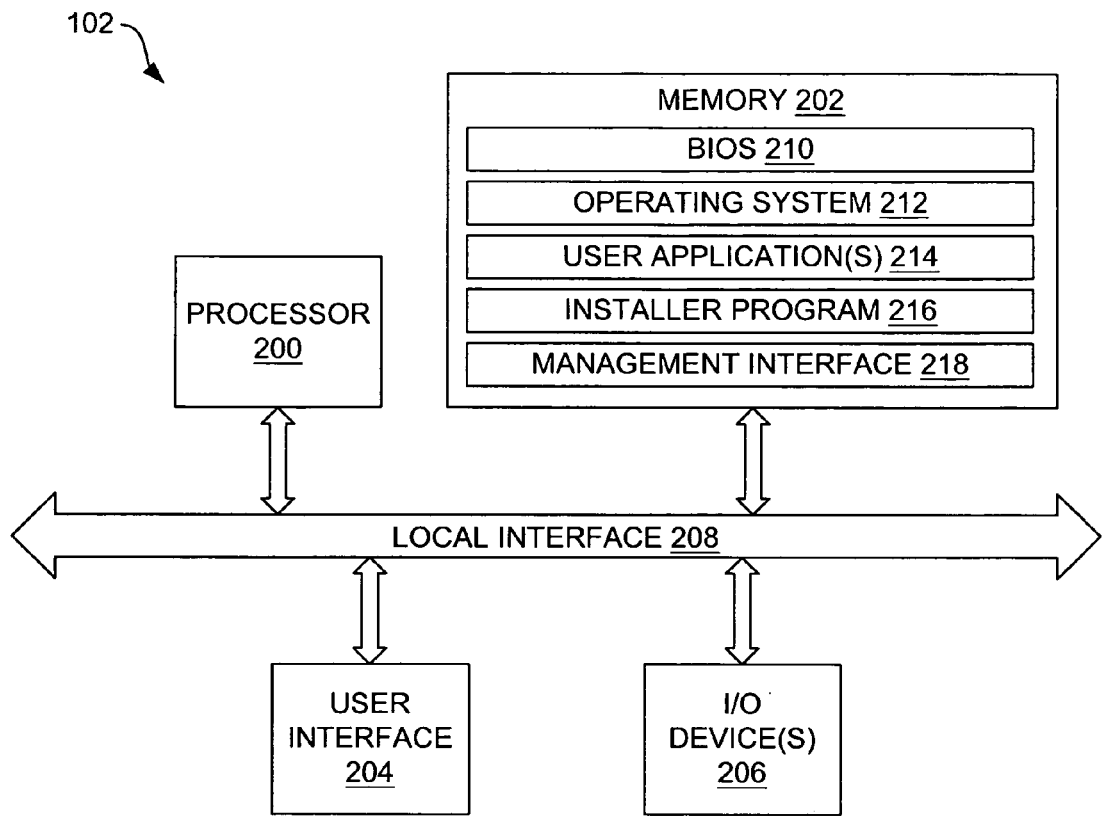
FIG. 2 is a block diagram of an embodiment of a computing device shown in FIG. 1.

FIG. 2 is a block diagram illustrating an example architecture for one of the computing devices 102 shown in FIG. 1. As indicated in FIG. 2, the computing device 102 comprises a processor 200, memory 202, a user interface 204, and one or more input/output (I/O) devices 206, each of which is connected to a local interface 208.

The processor 200 can include any custom-made or commercially-available processor, a central processing unit (CPU), an auxiliary processor among several processors associated with the computing device 102, or a semiconductor-based microprocessor (in the form of a microchip). The memory 202 includes one or more volatile memory elements (e.g., read access memory (RAM)) and one or more nonvolatile memory elements (e.g., erasable programmable read-only memory (EEPROM), flash memory, magnetic RAM (MRAM), etc.). In embodiments in which the computing device 102 comprises a terminal computer, the memory 202 may not include a hard drive or other such drive mechanism.

Instead, the nonvolatile memory element(s) act in the capacity of a hard drive. In embodiments in which the computing device 102 is a more conventional computer, such as a PC, memory 202 may further include a multi-disk hard drive.

The user interface 204 comprises those components with which a user (e.g., system administrator) can directly interact with the computing device 102. Those components can comprise components that are typically used in conjunction with a PC, such as a keyboard, a mouse, and a display (e.g., monitor).

The one or more I/O devices 206 comprise the components used to facilitate connection of the computing device 102 to other devices and therefore, for instance, comprise one or more serial, parallel, small system interface (SCSI), or universal serial bus (USB), or IEEE 1394 connection elements. In addition, the I/O devices 206 comprise the components used to transmit and/or receive data over a network (e.g., network 104, FIG. 1) such as, for example, a network card or modem.

The memory 202 normally comprises various programs including a basic input/output system (BIOS) 210, an operating system (O/S) 212, one or more user applications 214, and an installer program 216. The BIOS 210 comprises a program that comprises the code required to control various components that comprise and/or connect to the computing device (e.g., keyboard, display, etc.) and is responsible for controlling booting of the computing device. The O/S 212 operates on top of the BIOS 210 and controls the execution of other programs and provides scheduling, input-output control, file and data management, memory management, and communication control and related services. As described above, the O/S 212 may be stored within re-writable, solid-state memory (e.g., in flash memory) and, therefore, may be replaced with different operating system versions.

The user applications 214 comprise those programs that execute on top of the operating system 212 and may comprise, for example, a network browser program (e.g., Internet browser) and a media player program (e.g., audio and/or video player).

The installer program 216 is a program that is used to control what programs may be installed within the memory 202 of the computing device 102. By way of example, the installer program 216 may be specifically configured to control installation of new operating systems to ensure that the user may only install operating systems that he or she is authorized to install and use. Although the installer program 216 is depicted as being resident in memory 202, the installer program 216 may reside elsewhere until such time when a user requests installation of a program on the computing device 102. In such a case, the installer program 216 may be downloaded to the computing device 102 and executed from the device's system RAM to coordinate and control the installation.

As is further indicated in FIG. 2, memory 202 also includes a management interface 218, such as a desktop management interface (DMI). The management interface 218 that comprises an application program interface (API) that enables other programs to collect information about the configuration (software and/or hardware) of the computing device 102. As is described below, the management interface 218 can be used to store information about the programs contained in device memory 202 that can be read by the installer program 216.

Figure 3:
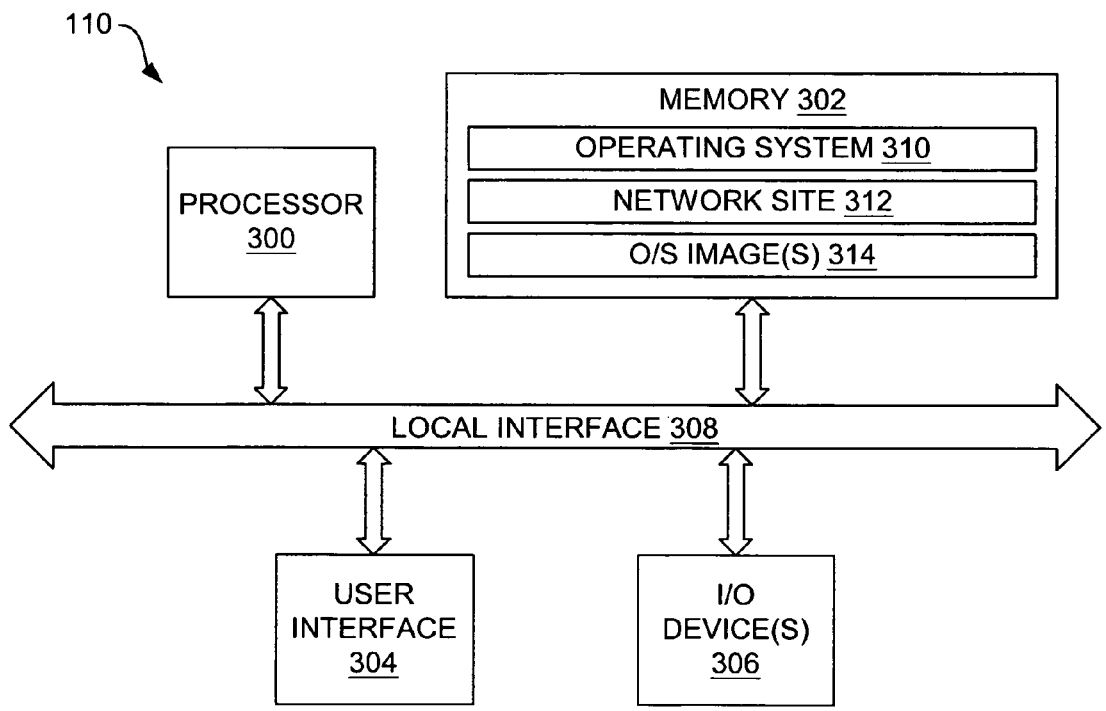
FIG. 3 is a block diagram of an embodiment of a server computer shown in FIG. 1.

FIG. 3 is a block diagram illustrating an example architecture for the server computer 110 shown in FIG. 1. As is indicated in FIG. 3, the server computer 110, like computing device 102, comprises a processor 300, memory 302, a user interface 304, and one or more I/O devices 306, each of which is connected to a local interface 308.

The processor 300 can include any custom-made or commercially-available processor, a central processing unit (CPU), an auxiliary processor among several processors associated with the server computer 110, or a semiconductor-based microprocessor (in the form of a microchip). The memory 302 can include any one or a combination of volatile memory elements (e.g., RAM) and nonvolatile memory elements (e.g., hard disk, tape, compact disc read-only memory (CDROM), etc.).

The user interface 304 and the one or more I/O devices 306 can, for example, be the same as or similar to the like-named components described above with reference to FIG. 2.

The memory 302 normally comprises at least an O/S 310, a network site 312, and at least one operating system image 314. The network site 312 comprises the various code that is used to support one or more network pages (e.g., web pages) that a user (e.g., system administrator) can visit to request download of a program configured for execution on a computing device 102 (FIG. 1). In some embodiments, the network site 312 comprises a web site that facilitates download of the operating system images 314 stored within memory 302 (e.g., hard disk).

Various programs (i.e., logic) have been described above. It is to be understood that those programs can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Example systems having been described above, control over program installation using such systems will now be discussed. In the discussions that follow, flow diagrams are provided. Any process steps or blocks in these flow diagrams may represent modules, segments, or portions of code that include one or more executable instructions for implementing specific logical functions or steps in the process. Although particular example process steps are described, alternative implementations are feasible. For instance, some steps may be executed out of order from that shown and discussed depending on the functionality involved.

Figure 4:
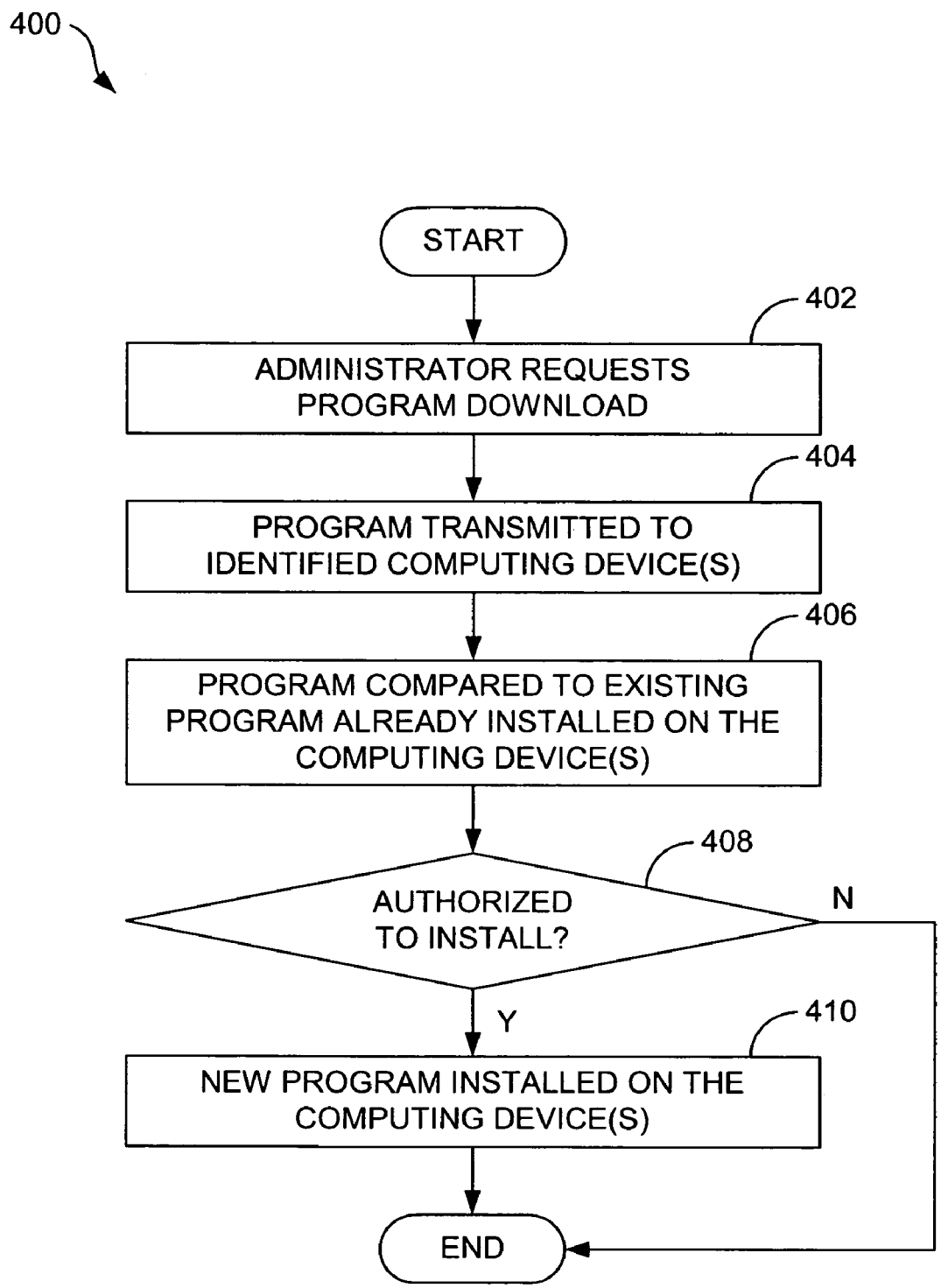
FIG. 4 is a flow diagram that illustrates an embodiment of controlling program installation on a computing device.

FIG. 4 illustrates an example method 400 of controlling program installation. Beginning with block 402, an administrator requests program download. By way of example, the administrator requests such download by visiting a web site (e.g., site 312, FIG. 3) using a computer (e.g., computer 106, FIG. 1). In such a scenario, the administrator may be requesting that a program be downloaded to a single computing device (e.g., device 102, FIG. 1), a few such devices, or many such devices. The request can identify the device(s) and/or path or location information that may be used to target the device(s).

Irrespective of the manner in which the program download is requested or the number of computing devices for which download is requested, a program is transmitted to the identified device(s), as indicated in block 404. By way of example, the program is directly transmitted to one or more universal resource locators (URLs) representing the devices via the Internet. In an alternative arrangement, the program is first downloaded to the administrator's computer for further distribution to the computing device(s) on which the program is to be installed (e.g., via local network 104).

With reference next to block 406, the received ("new") program is compared to the existing program that is already installed on the computing device(s). In some embodiments, that comparison is made relative to the configuration (e.g., type) of each program. For instance, the programs may be compared to determine whether they are made by the same developer and pertain to the same platform. From the comparison, a determination can be made as to whether the administrator (or other user) is authorized to install the new program on the computing device(s). Example criteria for that determination are discussed in relation to FIG. 5 below.

Referring to decision block 408, it is next determined whether the administrator is authorized to install the new program on the computing device(s). If not, installation does not occur and flow for the installation session is terminated. If, on the other hand, such authorization exists, the new program is installed on the computing device(s) (on each for which authorization exists), as indicated in block 410.

Figure 5:
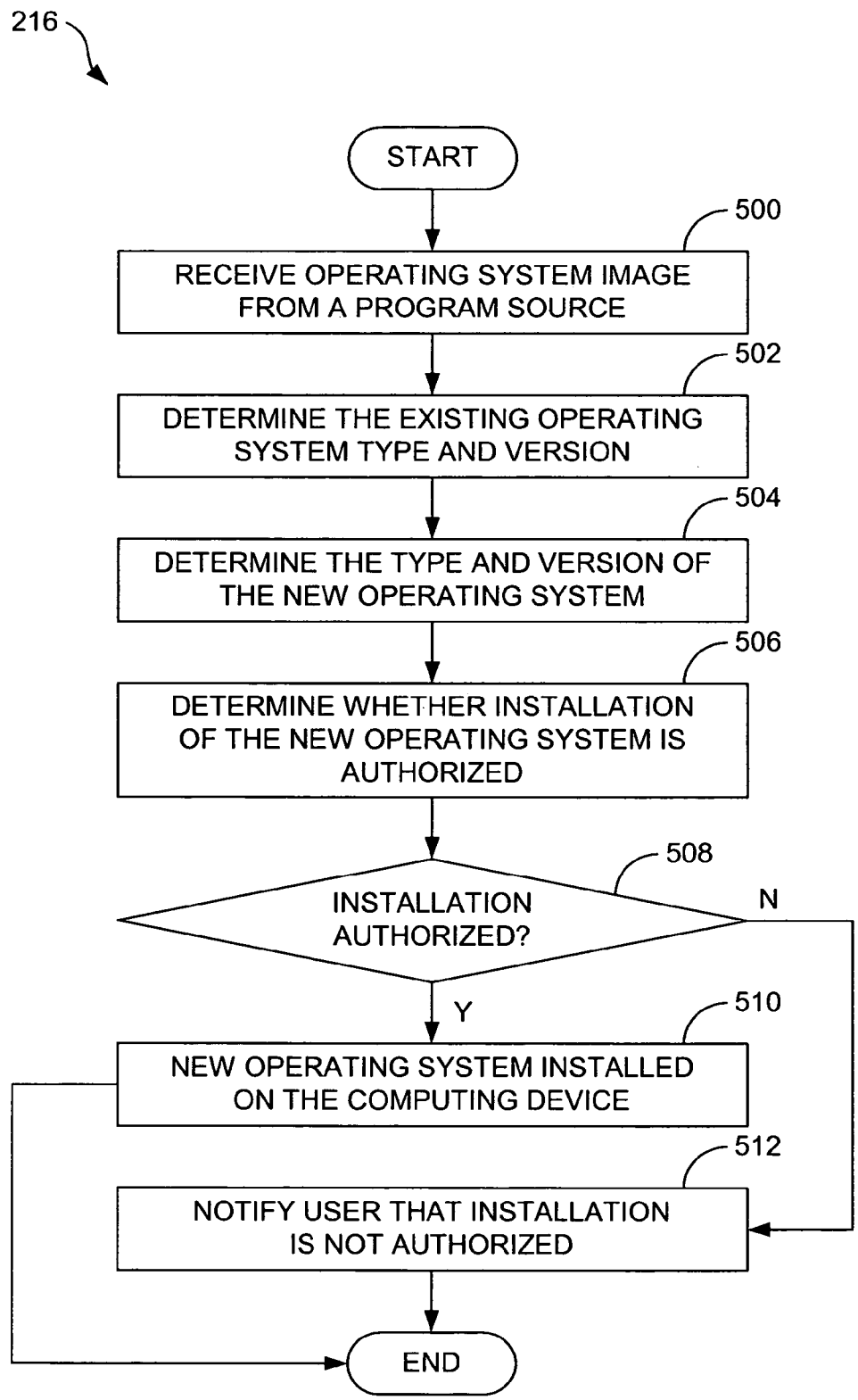
FIG. 5 is a flow diagram that illustrates an embodiment of operation of a installer program shown in FIG. 2 in controlling installation of an operating system on a computing device.

FIG. 5 illustrates an embodiment of operation of the installer program 216 executing on a computer device (e.g., computing device 102) to control the installation of a new operating system on the computing device. Beginning with block 500, the installer program 216 receives an operating system image from a program source. By way of example, the program source comprises a supplier (e.g., device manufacturer) that sends such images over the Internet from one or more server computers (e.g., server computer 110, FIG. 1).

Notably, the installer program 216 may have itself been sent via the Internet to the computing device 102 on which it executes along with or prior to transmission of the operating system image. For instance, if a user requested to download (and therefore install) a new operating system image on the computing device 102, the program source may have first transmitted the installer program 216 to the user's central control computer (e.g., computer 106, FIG. 1) and/or directly to the computing device to facilitate installation. In such a case, the installer program 216 may be responsible for retrieving the operating system image and installing it (assuming such installation is authorized). Such retrieval may be from memory (e.g., RAM) within the computing device 102 in cases in which the installer program 216 and the operating system image where downloaded to the computing device, another computer's hard drive (e.g., of the computer 106, FIG. 1), or from the original program source (e.g., server computer 110, FIG. 1).

Referring next to block 502, the installer program 216 determines the existing operating system type and version, i.e., the type and version of the computing device 102 on which the installer program executes. The type and version can be determined in a variety of different ways. In one embodiment, the installer program 216 sends a call (request, query, or command) to the management interface 218 (FIG. 2) of the computing device 102 so as to read configuration that is stored within that interface. By way of example, that information can be stored in an original equipment manufacturer (OEM) string of a system DMI. In one implementation, such a string may comprise 11 bits of information and may have the following definition:

TYPE 11: OEM Strings
Count=1
String=$OSTYPE<OS><MAJORVER><MINORVER>
    BYTE 0: $
    BYTE 1: O
    BYTE 2: S
    BYTE 3: T
    BYTE 4: Y
    BYTE 5: P
    BYTE 6: E
    BYTE 7: <OS>
    BYTE 8-9: <MAJOR VERSION>
    BYTE A-B: <MINOR VERSION>
    BYTE C: NULL (end of string)

where <OS> is defined as: "0"=No existing operating string; "1"=Windows Xpe; "2"=Windows CE.net; and "3"=Linux. The "<MAJOR VERSION>" and "<MINOR VERSION>" bytes can comprise American standard code for information interchange (ASCII) values that represent operating system-specific major and minor version identifiers, respectively. The OEM string can, for example, be populated during manufacturing of the computing device 102 using plug-and-play (PnP) calls 50h-52h as defined in the SMBIOS specification. Once the string is populated, it is typically protected so that it cannot be overwritten to prevent unauthorized installation of proprietary programs.

Returning to FIG. 5, the installer program 216 also determines the type and version of the new operating system (i.e., the system represented by the operating system image), as indicated in block 504. The installer program 216 can obtain this information by reading data contained in the image. For instance, the installer program 216 can read that information from headers of packets in which the operating system image was transmitted to the computing device. Alternatively, where the installer program 216 actually comprises part of the package sent to the computing device and is specifically designed to install a given operating system, the installer program 216 may inherently "know" the type and version of the operating system.

Next, the installer program 216 determines whether installation of the new operating system is authorized for the particular computing device 102 on which the installer is executing program. Various criteria can be used in making that determination. In some cases, the only criterion may be that the new operating system is of the same type as the existing operating system. For example, if the user is attempting to install a version of Windows CE.net and the computer already is running a version (e.g., the same version or an earlier version) of Windows CE.net, installation may be deemed to be authorized. If, on the other hand, the user is attempting to install Windows XP while the computer currently executes Windows CE.net, installation may not be authorized.

In other cases, both the type and versions of the operating systems are considered in making the determination. For example, if the computing device currently executes "version 3.0" of a given operating system, authorization may exist for installing "version 4.0" but not "version 2.0" or "version 1.0." It will be appreciated that various other criteria could be used in making the determination of block 506.

With reference to decision block 508, flow at this point depends whether or not installation is authorized. If installation is authorized, flow continues to block 510 and the installer program 216 installs the operating system (or enables such installation) on the computing device. After such installation has been completed, no further control function is needed and, therefore, flow for the session is terminated.

If installation is not authorized, however, the installer program does not install the new operating system (i.e., prevents installation) and flow continues to block 512 at which the user is notified that authorization does not exist and that the new operating system will not be (or has not been) installed. By way of example, that notification comprises a pop-up notice that appears in the user's display (e.g., monitor of the computer 106, FIG. 1). In such a case, flow is also terminated and the user may reattempt installation (if he or she believes an error occurred) or install an operating system version for which he or she is authorized.

Figure 6:
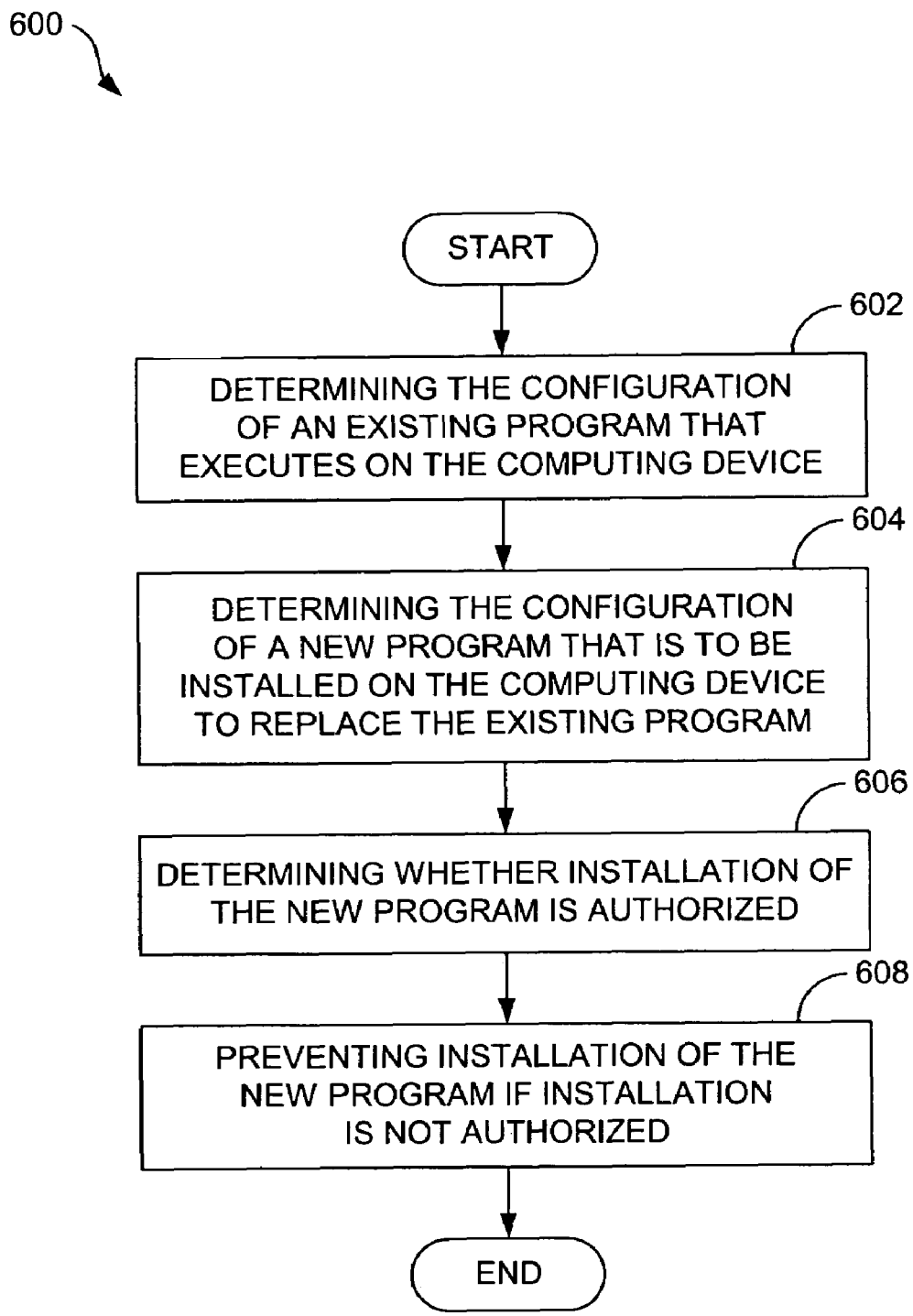
FIG. 6 is a flow diagram that illustrates a further embodiment of controlling program installation on a computing device.

Another method for controlling program installation on a computing device is described in FIG. 6. As indicated in that figure, the method 600 comprises determining the configuration of an existing program that executes on the computing device (block 602), determining the configuration of a new program that is to be installed on the computing device to replace the existing program (block 604), determining whether installation of the new program is authorized (block 606), and preventing installation of the new program if installation is not authorized (block 608).

What is claimed is:

1. A method for controlling program installation on a computing device, the method comprising:
    an installer program that executes on the computing device determining the type of an original operating system currently installed on the computing device;
    the installer program that executes on the computing device determining the type of a new operating system that a user is attempting to install on the computing device to replace the original operating system from information stored within a software package that comprises the new program operating system;
    the installer program that executes on the computing device comparing on the computing device the types of the original and new operating systems to determine whether installation of the new operating system is authorized; and
    the installer program that executes on the computing device preventing installation of the new operating system if the types are not the same.

2. The method of claim 1, further comprising the installer program determining the versions of the original operating system and the new operating system.

3. The method of claim 1, wherein determining the type of an original operating system comprises determining the type of an original operating system that is embedded in solid-state memory of the computing device.

4. The method of claim 1, wherein determining the type of an original operating system comprises determining the type of an operating system that is embedded in re-writable, solid-state memory of a terminal computer.

5. The method of claim 1, wherein determining the type of an original operating system comprises reading information stored in a management interface of the computing device.

6. The method of claim 1, wherein determining the type of an original operating system comprises reading information from an original equipment manufacturer (OEM) string of a desktop management interface (DMI) of the computing device.

7. The method of claim 1, wherein determining the type of a new operating system comprises reading information from a header associated with the new operating system.

8. The method of claim 1, further comprising:
    the computing device receiving the software package from a software source via a network, wherein the software package contains the installer program;
    the computing device identifying the installer program contained in the software package; and
    the computing device installing the installer program on the computing device prior to determining whether installation of the new program is authorized.

9. A computer-readable medium that stores a installer program, the installer program comprising:
    logic configured to execute on a user computer and determine on the user computer the type of an existing operating system installed on the user computer;
    logic configured to execute on the user computer and determine on the user computer the type of a new operating system that has been downloaded to the user computer;
    logic configured to execute on the user computer and compare on the user computer the types of the new and existing operating systems;
    logic configured to execute on the user computer and to determine that installation of the new operating system is not authorized when the types are not the same; and
    logic configured to execute on the user computer and prevent installation of the new operating system when it is determined that installation is not authorized.

10. The system of claim 9, wherein the logic configured to determine the type of an existing operating system comprises logic configured to read configuration information stored in a management interface of the computing device.

11. The system of claim 9, wherein the logic configured to determine the type of a new operating system comprises logic configured to read configuration information from a header associated with the new operating system.

12. The system of claim 9, further comprising logic configured to install the new operating system and replace the existing operating system when installation is authorized.

13. The computer-readable medium of claim 9, wherein the installer program comprises part of a software package that is configured for download to the user computer, the software package further including the new operating system such that the installer program will be run on the user computer when the new operating system is downloaded to the user computer and a user attempts to install the new operating system on the user computer.

14. A computing device, comprising:
    a processor; and
    memory comprising a previously-installed operating system, a management interface that comprises information that describes the type and version of the previously-installed operating system, and an installer program configured to (i) determine the type of the previously-installed operating system from the information of the management interface, (ii) determine the type of a new operating system with which a user is attempting to replace the previously-installed operating system from information stored within a software package that contains the new operating system, (iii) compare the types of the new and previously-installed operating systems and determine that installation of the new operating system is not authorized if the types of the new and previously-installed operating systems are not the same, and (iv) prevent installation of the new operating system if it is determined that installation is not authorized.

15. The device of claim 14, wherein the memory comprises re-writable, solid-state memory and wherein the previously-installed operating system is embedded within the solid-state memory.

16. The device of claim 14, wherein the management interface comprises a desktop management interface (DMI) and the information is stored in an original equipment manufacturer (OEM) string contained within the DMI.

17. The device of claim 14, wherein the computing device is a terminal computer that does not comprise a hard drive.

18. The computing device of claim 14, wherein the installer program comprises part of the software package such that the installer program will be run on the user computer when the new operating system is downloaded to the user computer from a software source and a user attempts to install the new operating system on the computing device.

* * * * *

UNITED STATES PATENT AND TRADEMARK OFFICE
CERTIFICATE OF CORRECTION

| | | |
|---|---|---|
| PATENT NO. | : 7,694,280 B2 | Page 1 of 1 |
| APPLICATION NO. | : 10/812220 | |
| DATED | : April 6, 2010 | |
| INVENTOR(S) | : Don R. James, Jr. et al. | |

It is certified that error appears in the above-identified patent and that said Letters Patent is hereby corrected as shown below:

In column 8, line 10, delete "The system" and insert --The computer-readable medium--, therefor.

In column 8, line 14, delete "The system" and insert --The computer-readable medium--, therefor.

In column 8, line 18, delete "The system" and insert --The computer-readable medium--, therefor.

Signed and Sealed this

Thirtieth Day of November, 2010

David J. Kappos
*Director of the United States Patent and Trademark Office*